(12) United States Patent
Coolen

(10) Patent No.: US 11,919,724 B2
(45) Date of Patent: Mar. 5, 2024

(54) TRANSPORTER SYSTEM

(71) Applicant: Canline Systems B.V., Eersel (NL)

(72) Inventor: Ruud Coolen, Reusel (NL)

(73) Assignee: Canline Systems B.V., Eersel (NL)

( * ) Notice: Subject to any disclaimer, the term of this patent is extended or adjusted under 35 U.S.C. 154(b) by 1 day.

(21) Appl. No.: 18/052,651

(22) Filed: Nov. 4, 2022

(65) Prior Publication Data
US 2023/0145156 A1 May 11, 2023

(30) Foreign Application Priority Data

Nov. 8, 2021 (NL) .................................... 2029672

(51) Int. Cl.
*B65G 47/24* (2006.01)
*B65G 11/20* (2006.01)
(52) U.S. Cl.
CPC ............ *B65G 47/24* (2013.01); *B65G 11/203* (2013.01); *B65G 2207/08* (2013.01)
(58) Field of Classification Search
CPC ... B65G 11/203; B65G 47/24; B65G 2207/08
USPC .................... 198/373, 377.01, 383
See application file for complete search history.

(56) References Cited

U.S. PATENT DOCUMENTS

| | | | | |
|---|---|---|---|---|
| 1,193,624 A | * | 8/1916 | Small ................... | B65G 47/248 16/DIG. 60 |
| 3,208,579 A | * | 9/1965 | Perrier .................. | B01F 29/331 198/377.01 |
| 3,331,486 A | * | 7/1967 | Towry ................. | B65G 47/1471 198/398 |
| 3,797,624 A | * | 3/1974 | Powell ................. | B65G 11/183 193/38 |
| 4,364,463 A | * | 12/1982 | Faltus .................... | B65G 15/14 198/405 |

(Continued)

FOREIGN PATENT DOCUMENTS

IT MO20110026 A1 8/2012

OTHER PUBLICATIONS

International Searching Authority at European Patent Office; Report concerning novelty search of International Type, International Search Report and Written Opinion for Netherlands patent application No. NL2029672; report date Jun. 24, 2022.

*Primary Examiner* — Douglas A Hess
(74) *Attorney, Agent, or Firm* — McDonnell Boehnen Hulbert & Berghoff LLP

(57) ABSTRACT

A transporter system is provided for transporting a stream of substantially cylindrical objects, the transporter system comprising an intermediate orientation changing transporter section arranged between the first and second transporter section, the intermediate orientation changing transporter section comprising a plurality of stationary guide rails arranged to delimit at least part of an orientation changing passage through which the stream of substantially cylindrical object is guided and a rotatable frame comprising a first movable guide rail configured to delimit the remaining part of the orientation changing passage when the rotatable frame is in a first rotational position and a second movable guide rail configured to delimit the remaining part of the orientation changing passage when the rotatable frame is the second rotational position.

19 Claims, 16 Drawing Sheets

(56) References Cited

U.S. PATENT DOCUMENTS

| | | | | |
|---|---|---|---|---|
| 4,458,801 A * | 7/1984 | Nichols | ............... | B65G 11/063 |
| | | | | 221/172 |
| 4,492,299 A * | 1/1985 | McLeod | ............. | B65G 47/248 |
| | | | | 198/417 |
| 4,798,278 A * | 1/1989 | Cornacchia | ......... | B65G 47/252 |
| | | | | 414/773 |
| 5,609,237 A * | 3/1997 | Lenhart | ............... | B65G 47/248 |
| | | | | 198/417 |
| 7,617,921 B2 * | 11/2009 | Workman | ........... | B65G 11/103 |
| | | | | 193/29 |
| 10,703,523 B2 * | 7/2020 | Thomas | .................. | B65B 43/52 |
| 10,807,806 B1 * | 10/2020 | Womack | ............ | B65G 11/063 |
| 11,091,324 B1 * | 8/2021 | Turck | .................. | B65G 47/244 |
| 11,247,848 B2 * | 2/2022 | Monteiro Teixeira | ...................... | |
| | | | | B65G 47/24 |
| 2008/0203109 A1 | 8/2008 | Workman et al. | | |

* cited by examiner

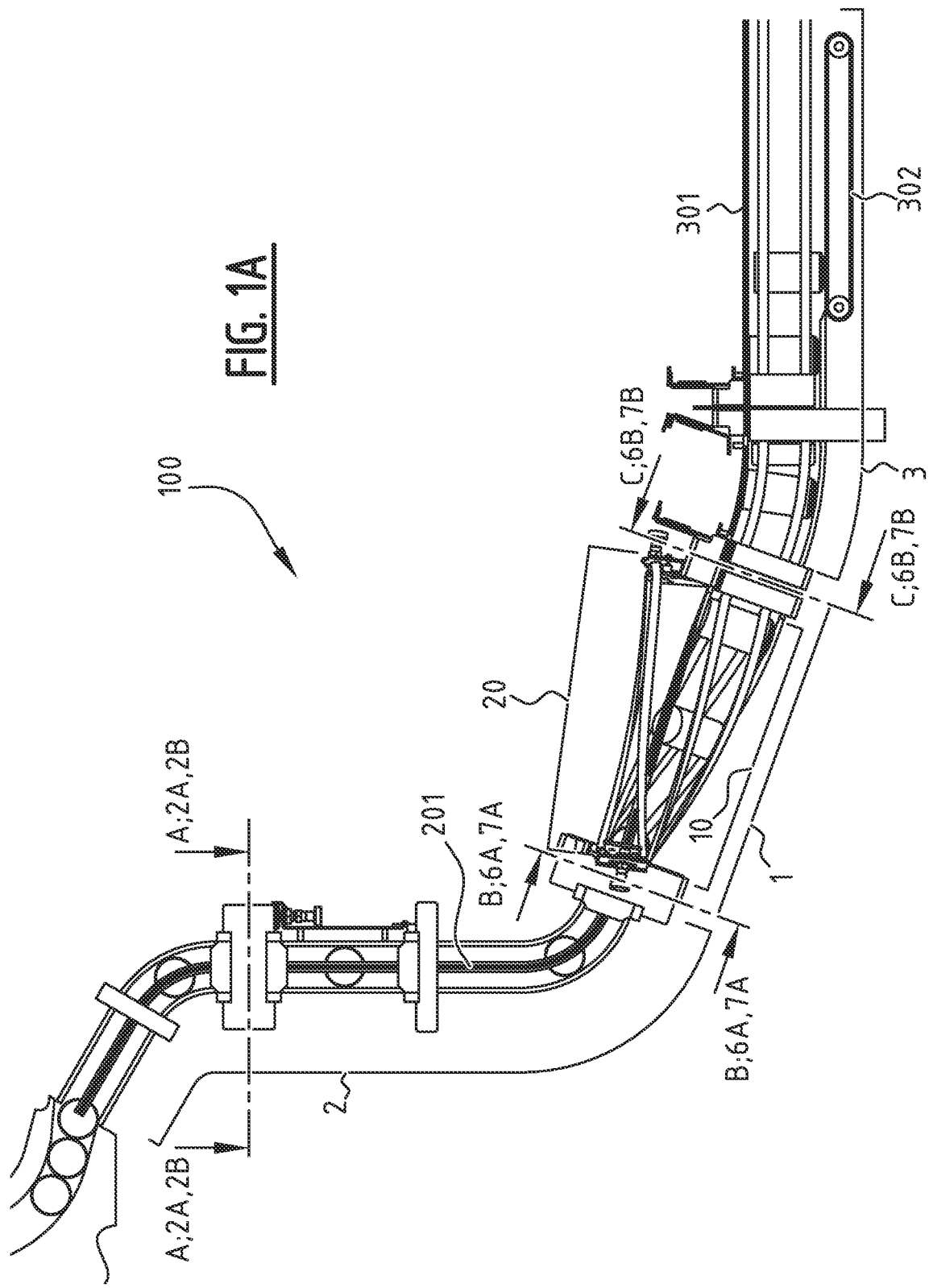

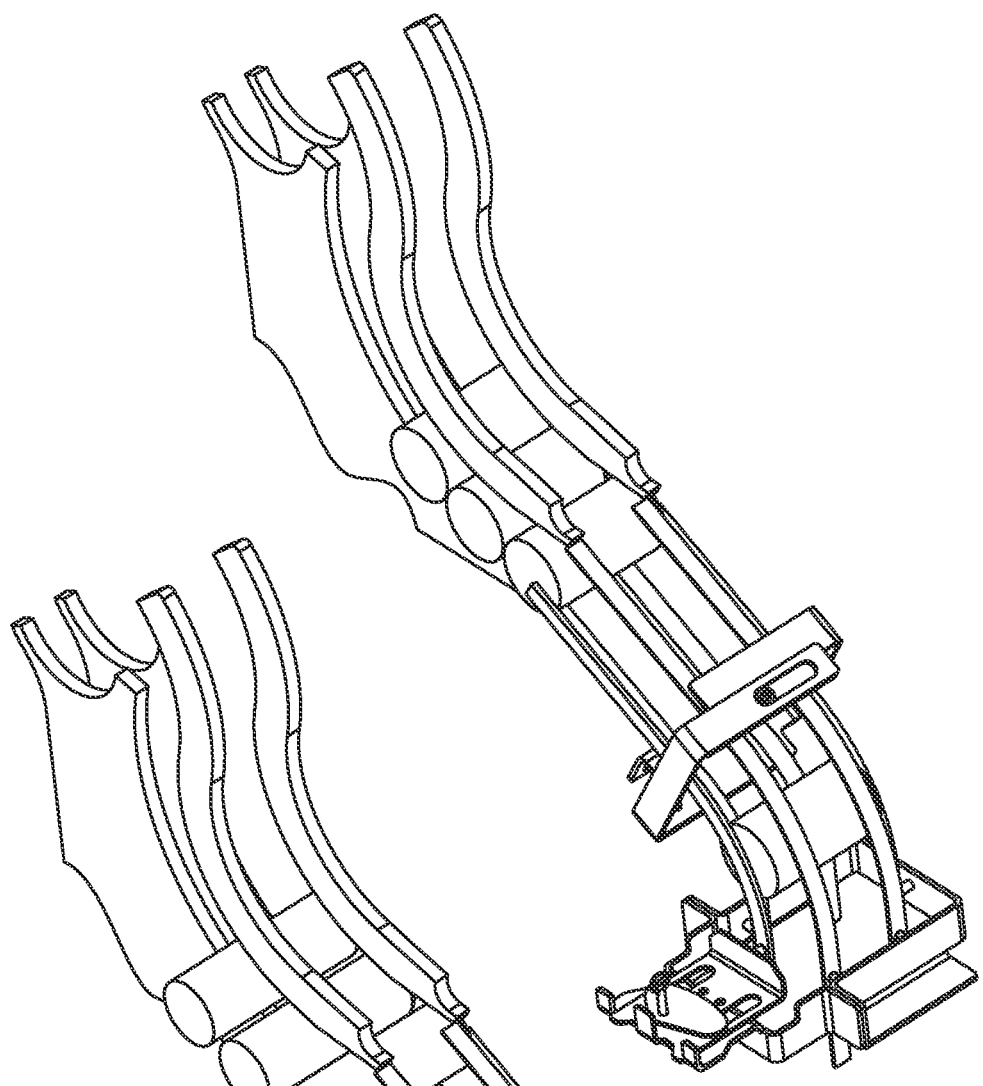
FIG. 3A1
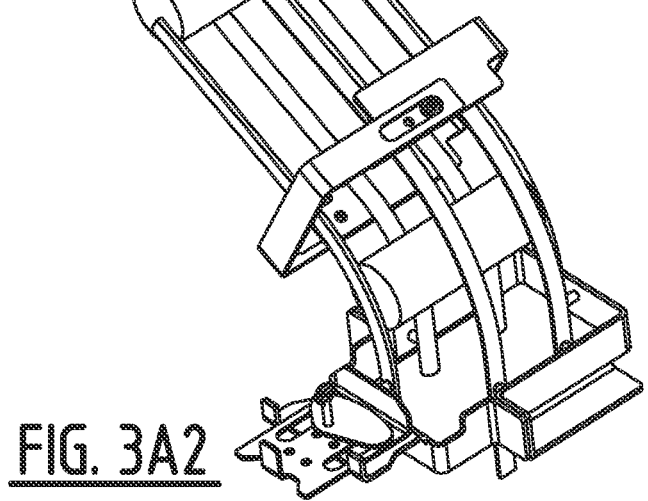
FIG. 3A2

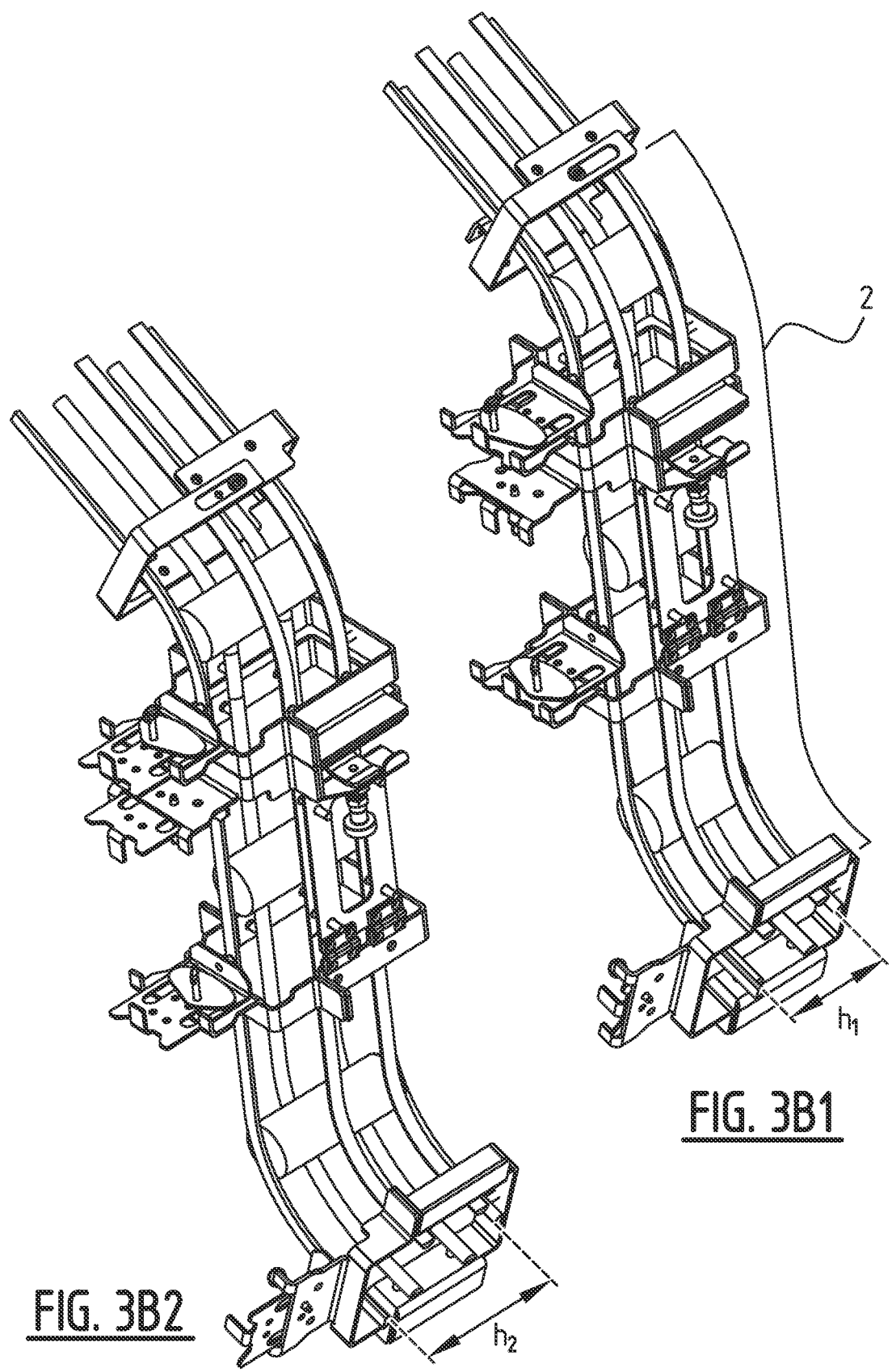

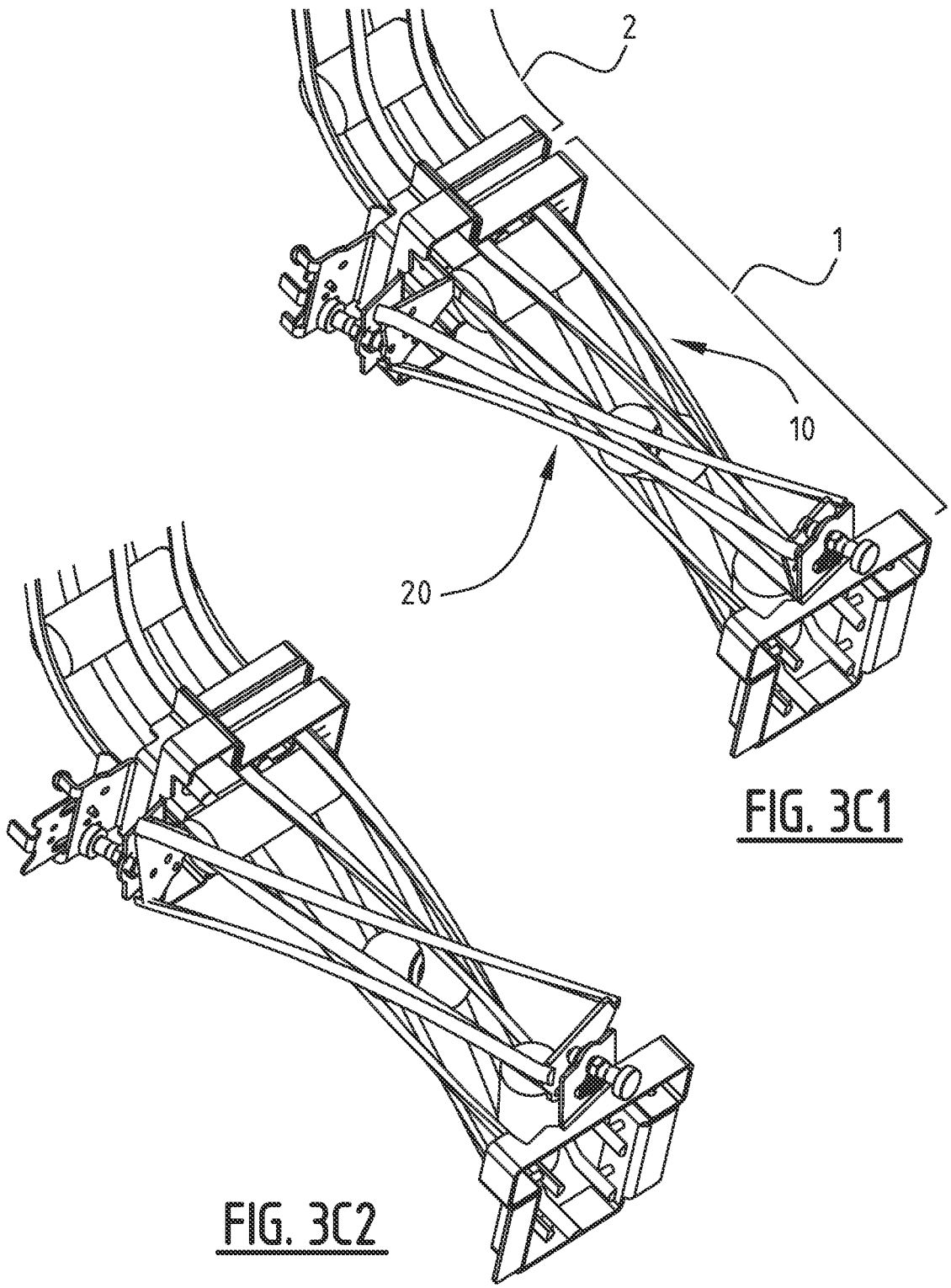

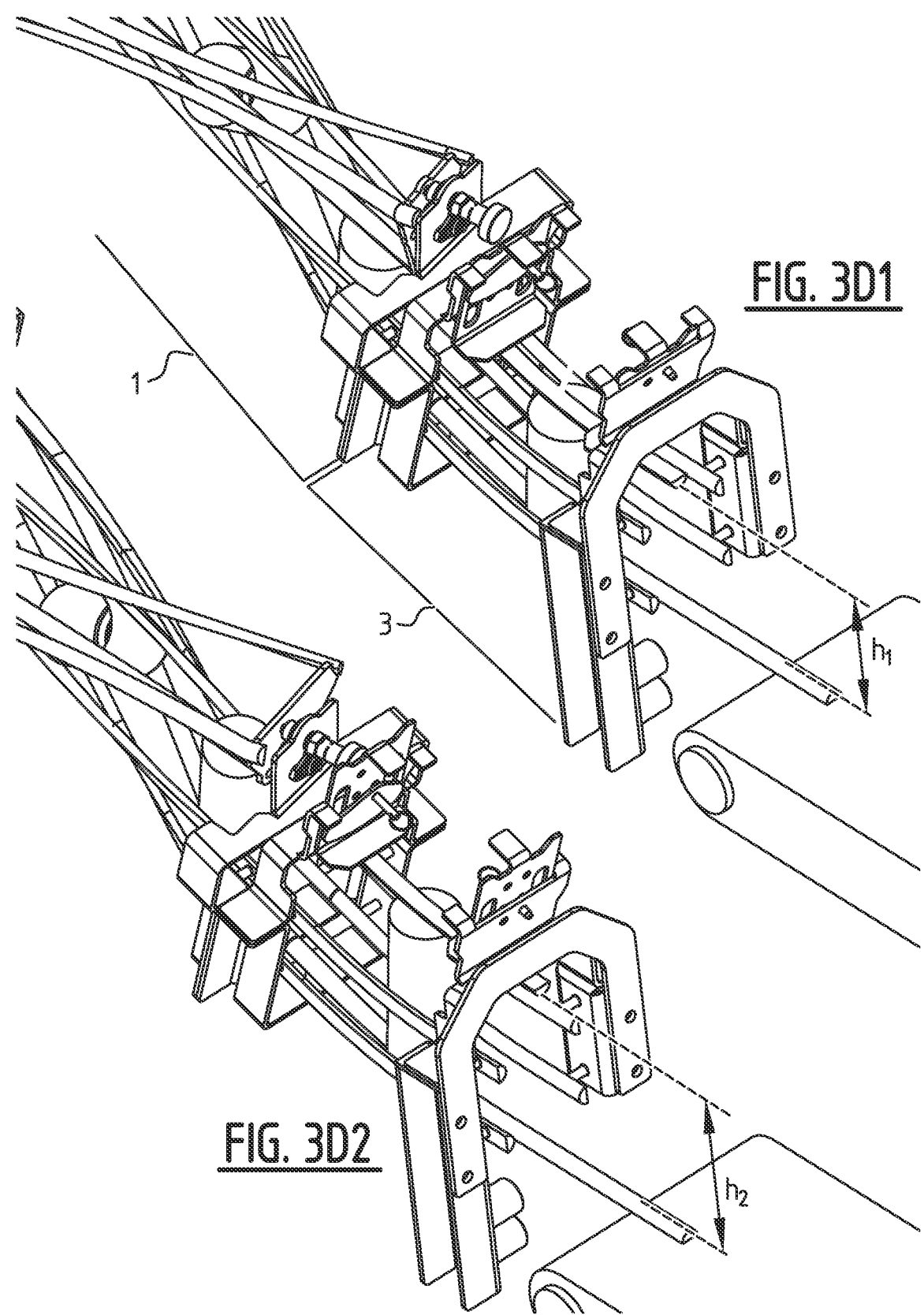

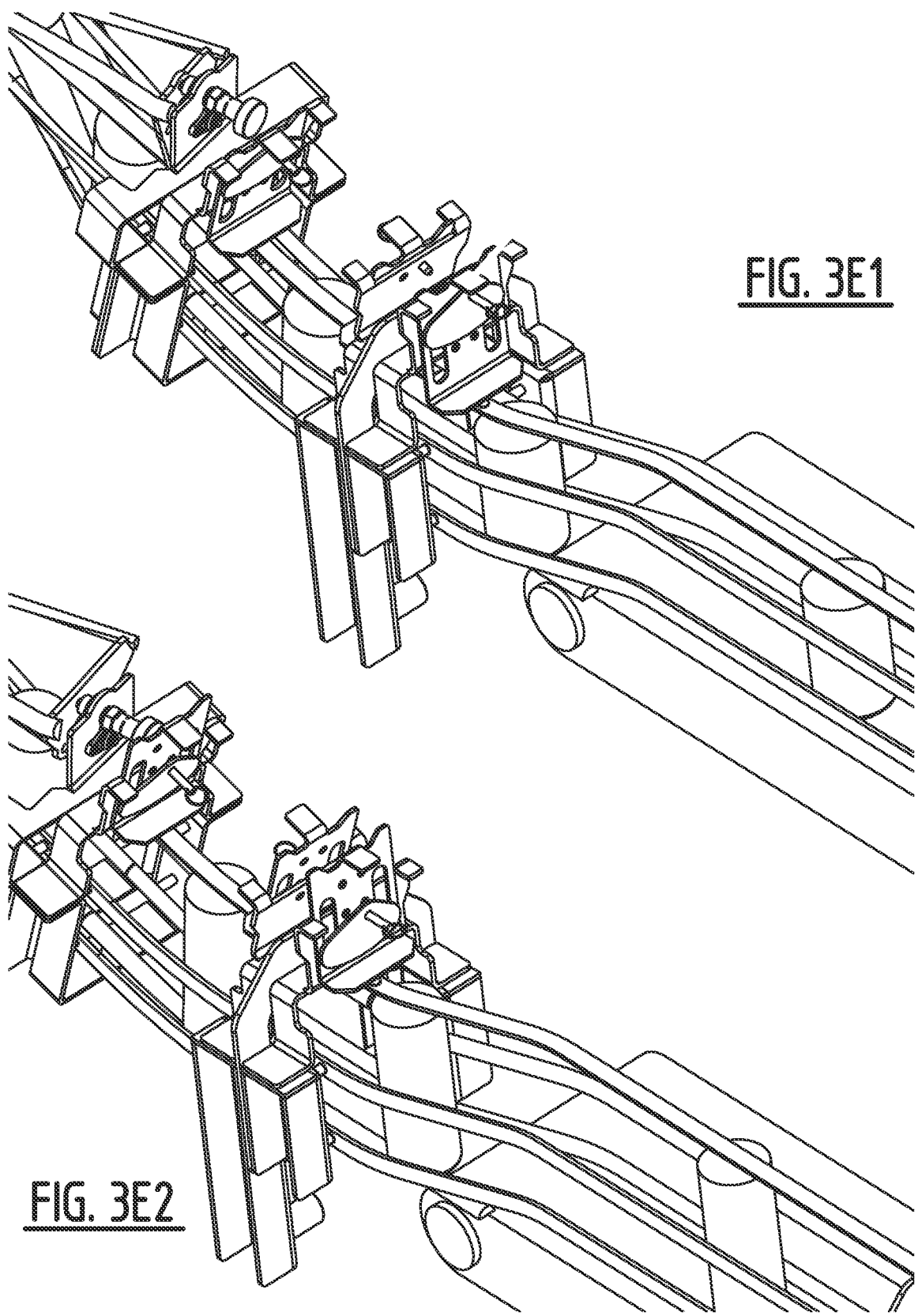

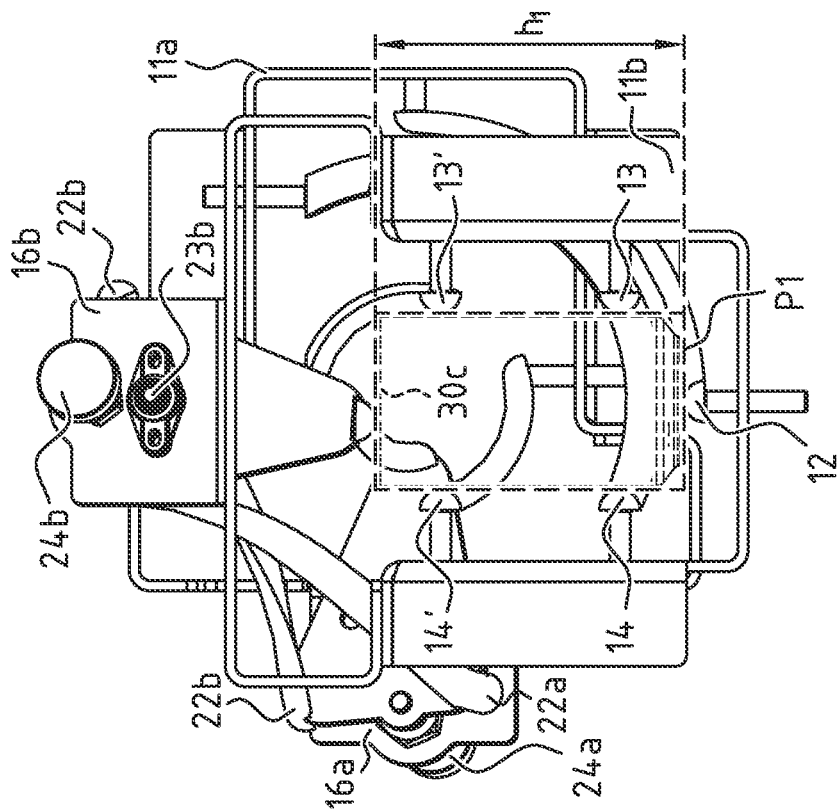
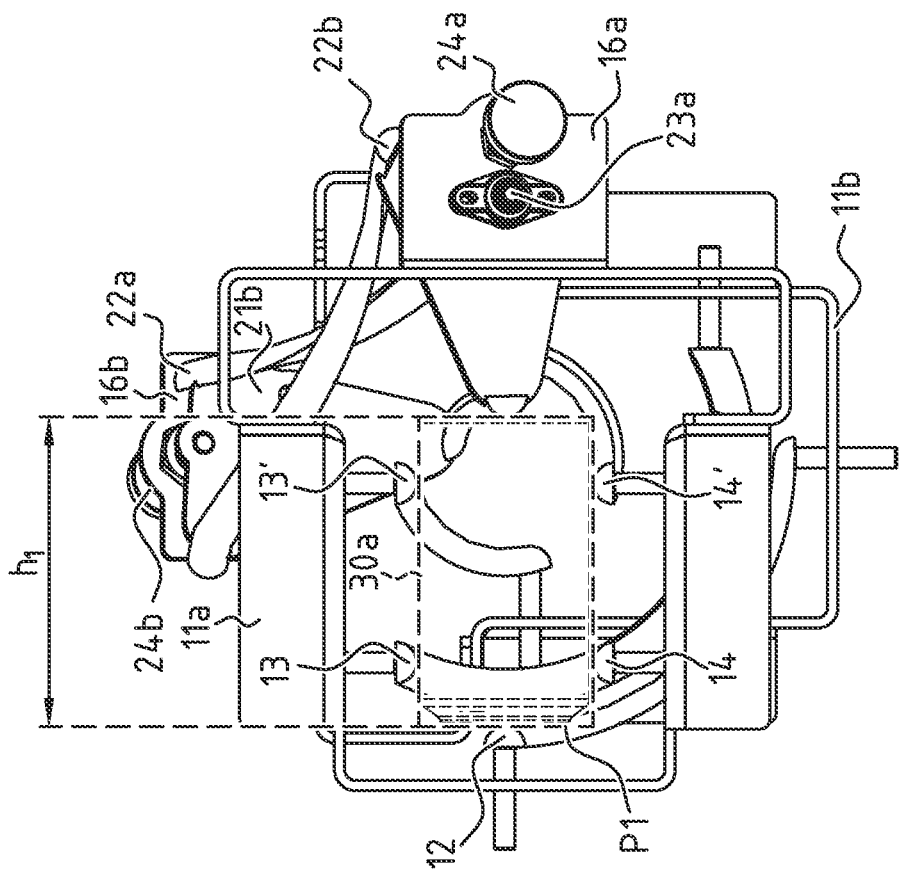
FIG. 6B
FIG. 6A

TRANSPORTER SYSTEM

CROSS-REFERENCE TO RELATED APPLICATION

This application claims priority to Netherlands Patent Application No. 2029672, filed Nov. 8, 2021 and titled Transporter System. Netherlands Patent Application No. 2029672 is incorporated herein by reference in its entirety.

BACKGROUND

The present disclosure relates to a transporter system for transporting a stream of substantially cylindrical objects, and to an orientation changing transporter section. The orientation changing transporter section may be included in a transporter system and may be configured to change the orientation of each of the substantially cylindrical objects in the stream of substantially cylindrical objects.

Transporter systems known in the art comprise a plurality of sections, and each section may comprise a plurality of guide rails delimiting a passage through which the stream of substantially cylindrical objects may pass. The sections may define straight passages and/or curved passages. Furthermore, in the known systems orientation changing sections may be included to change the orientation of the objects, for instance from a first or horizontal position to a second or vertical position.

In order for a transporter system to be able to handle different types of cylindrical objects, for instance cylindrical objects of different sizes (for instance, to first handle a batch of relatively short cylindrical objects and afterwards handling a batch of relatively long cylindrical objects) the passages on the straight sections may be enlarged or reduced in size by repositioning at least one of the guiding rails. In sections wherein the orientation of the objects is to be changed, this changing of the size of the passage is often not possible or at least not feasible by just repositioning the same guiding rails. One or more of the guiding rails needs to be manually removed from the transporter system and be replaced by differently shaped guiding rails. In practice this may involve high labor costs, relatively long down times, wear as a result of inaccurate repositioning of the guiding rails, and risk of malfunctioning (blocking of the objects) in the course of time.

Overview

The present application provides a transporter system and/or an orientation changing section of a transporter system wherein at least one of the above-mentioned disadvantages has been removed or at least reduced. The application further provides a transporter system and/or an orientation changing section that allow for a change of the orientation of the transported substantially cylindrical objects while still being able to easily, efficiently and accurately adapt the transporter system and/or the orientation changing transporter section to be able to handle objects of different sizes.

At least some of features can be implemented in a transporter system for transporting a stream of substantially cylindrical objects, the transporter system comprising:

a first and second transporter section, wherein each transporter section comprises:

an inlet, configured to receive the stream of substantially cylindrical objects;

an outlet, configured to discharge the stream of substantially cylindrical objects;

a plurality of stationary guide rails arranged to delimit a part of a passage through which the stream of substantially cylindrical objects is guided, and wherein the passage extends from the inlet to the outlet;

at least one movable guide rail arranged to delimit a remaining part of the passage, and configured to be moved from a first position to at least a second position to change the size of the cross-section of the passage;

wherein the first transporter section is configured to delimit a first passage wherein the substantially cylindrical objects extend in a first orientation and the second transporter section is configured to delimit a second passage wherein the substantially cylindrical objects extend in a second orientation different from the first orientation;

an intermediate orientation changing transporter section arranged between the first and second transporter section, the intermediate orientation changing transporter section comprising an inlet configured to receive the stream of substantially cylindrical objects from the first transporter section, an outlet configured to discharge the stream of substantially cylindrical objects to the second transporter section, a plurality of stationary guide rails arranged to delimit at least part of an orientation changing passage through which the stream of substantially cylindrical objects is guided;

wherein the intermediate orientation changing transporter section further comprises a rotatable frame configured to be rotated with respect to the plurality of stationary guide rails to a plurality of rotational positions, wherein the rotatable frame comprises a first movable guide rail configured to delimit the remaining part of the orientation changing passage when the rotatable frame is in first rotational position and a second movable guide rail configured to delimit the remaining part of the orientation changing passage when the rotatable frame is the second rotational position;

wherein the plurality of stationary guide rails and the rotatable frame with the first and second movable guide rails are configured to, when the stream of consecutive substantially cylindrical objects is guided through the orientation changing passage, change the orientation of each of the substantially cylindrical objects in the stream of substantially cylindrical objects from the first orientation to the second orientation; and wherein the first and second movable guide rails of the intermediate orientation changing transporter section are configured to define orientation changing passages having different sizes in cross-section.

The size in cross-section of a passage determines the size of the cylindrical objects to be transported (in principle the size in cross-section of the passage only determines the maximum size of the cylindrical objects. However, in practice the size of the passage should correspond to the size of the objects (at least in one dimension) in order to enable a proper and smooth transport of the objects in the object stream). Changing the size of the passage by moving the movable guiding rails in the first and second transporter sections and by rotating the rotatable frame in the intermediate orientation changing transporter section makes is therefore possible to easily adapt the transporter system to transport differently sized (i.e. smaller or larger) cylindrical objects, while maintaining the possibility to change the orientation of the transported objects in the intermediate orientation changing transporter section.

As mentioned above, different sizes of the passages of the first and second transporter sections can be accomplished by appropriate movement of the movable guiding rails of the first and second transporter sections, for instance by sliding the associated movable guiding rail inward or outward to reduce or enlarge the size of the passage, respectively. Different size of the passage of the intermediate orientation changing transporter section can be accomplished by appropriate rotation of the rotatable frame and the movable guiding rails forming part thereof to a suitable rotational position. When the rotatable frame is in a suitable rotational position from the plurality of rotational positions and when the movable guiding rails of the first and second transporter sections are in the appropriate (first or second) position, the end of the movable guiding rail of the first transporter section is aligned with the associated end of the movable guiding rail of the intermediate section so as to provide a smooth transition from the first passage to the orientation changing passage. Similarly, the end of the movable guiding rail of the intermediate orientation changing transporter section is aligned with the associated end of the movable guiding rail of the second transporter section so as to provide a smooth transition from the orientation changing passage to the second passage.

The stream of cylindrical objects may be comprised of a row of consecutively arranged cylindrical objects, such as cans, liquid containers, etc. Typically, the transporter system is configured to allow handling of relatively large cans having a content of 50 cl and handling of smaller cans having a content of 30 cl or the like. Preferably the cylindrical objects are rotated (along their respective imaginary longitudinal axis) as much as possible along the guiding rails when they extend in the first (for instance horizontal orientation) so as to reduce friction (and thereby potentially wear of the guiding rails) relative to the situation wherein the cylindrical objects slide along the guiding rails. In other words, in the above-mentioned first transporter section the cylindrical objects are preferably caused to rotate during transporting them from the inlet to the outlet. When the cylindrical objects are in the second (for instance vertical position, in the second transporter section) or when the cylindrical objects are in the of receiving a different orientation, i.e. from the first to the second orientation when being transported through the third passage of the third transporter section), the cylindrical objects will tend to slide rather than rotate.

In embodiments of the present disclosure the rotatable frame is configured to be rotated around a rotational axis. The first and the second movable guide rails of the intermediate orientation changing transporter section are mounted on the rotatable frame at a first distance from the rotational axis, and a second distance from the rotational axis, different from the first distance, respectively.

The intermediate orientation changing transporter section is preferably configured to, when the stream passes through the passage of the intermediate orientation changing transporter section, change the orientation of each of the substantially cylindrical objects in the stream by between 45 and 135 degrees, and preferably by approximately 90 degrees.

As each substantially cylindrical object from the stream of substantially cylindrical objects defines a longitudinal axis, the intermediate orientation changing transporter section is preferably configured to, when the substantially cylindrical object passes through the passage of the intermediate orientation changing transporter section, change the orientation of the longitudinal axis of the substantially cylindrical objects.

To limit the number of movable guide rails, it is considered advantageous to have each of the movable guide rails from the plurality of movable guide rails correspond to a rotational position. Preferably, there is a one-to-one relationship between movable guide rails from the plurality of movable guide rails and rotational positions from the plurality of rotational positions.

Specifically, in embodiments of the present disclosure, the plurality of movable guide rails comprises one or more further movable guide rails. The plurality of rotational positions may comprise one or more further rotational positions corresponding to the one or more further movable guide rail. When the rotatable frame is positioned in one of the one or more further rotational positions, the associated movable guide rail may delimit the remaining part of the passage of the intermediate orientation changing transporter section.

In embodiments of the present disclosure, in each section, the plurality of stationary guide rails and at least one movable guide rail are further arranged to delimit a passage having a substantially rectangular cross-section, the rectangular cross-section being described by a height and a width. Specifically, in each section, the at least one movable guide rail is preferably further configured to be moved from the first position to the second position, thereby changing either the height, or the width of the cross-section of the passage.

In embodiments of the present disclosure, the inlet of the intermediate orientation changing transporter section is configured to receive the stream with each of the substantially cylindrical objects from the stream in a first orientation and/or the outlet of the intermediate orientation changing transporter section is configured to discharge the stream with each of the substantially cylindrical objects from the stream in a second orientation, different from the first orientation.

In embodiments of the present disclosure, the first orientation is a substantially horizontal orientation (i.e. perpendicular to the direction of gravity), while the second orientation may be a substantially vertical orientation (i.e. corresponding to the direction of gravity). In certain embodiments of the present disclosure the first transporter section is a section having its inlet at a higher position than its outlet. The first transporter section may form a chute or chute section for causing the cylindrical objects to be transported passively, i.e. without further external drive means, from the inlet to the outlet at least partially as a result of the gravitational force acting on the objects. The driving mechanism for the objects in the intermediate orientation changing transporter section may be a gravitational force, the inertia of mass of the objects arriving from the first transporter section or a combination thereof. The driving mechanism of the objects in the second transporter section may be similar to that in the intermediate orientation changing transporter section. Additionally or alternatively, the driving mechanism of the objects in the second transporter section may be an active driving mechanism, for instance a transporter, for instance an endless belt transporter, arranged beneath the passage through the second transporter section.

In embodiments of the present disclosure, the first transporter section is configured for each of the substantially cylindrical objects from the stream in the first orientation to roll and/or fall through the passage. In embodiments of the present disclosure, the second transporter section is configured for each of the substantially cylindrical objects from the stream in the second orientation to slide through the passage.

According to another aspect an orientation changing transporter section configured to be included in a transporter system for transporting a stream of substantially cylindrical objects is provided, wherein the orientation changing transporter section comprises an inlet configured to receive the stream of substantially cylindrical objects, an outlet configured to discharge the stream of substantially cylindrical objects, a plurality of stationary guide rails arranged to delimit at least part of an passage through which the stream of substantially cylindrical objects is guided, wherein the intermediate orientation changing transporter section further comprises a rotatable frame configured to be rotated with respect to the plurality of stationary guide rails to a plurality of rotational positions, wherein the rotatable frame comprises a first movable guide rail configured to delimit the remaining part of the orientation changing passage when the rotatable frame is in first rotational position and a second movable guide rail configured to delimit the remaining part of the orientation changing passage when the rotatable frame is the second rotational position, wherein the plurality of stationary guide rails and the rotatable frame with the first and second movable guide rails are configured to, when the stream of consecutive substantially cylindrical objects is guided through the orientation changing passage, change the orientation of each of the substantially cylindrical objects in the stream of substantially cylindrical objects from the first orientation to the second orientation, and wherein the first and second movable guide rails of the intermediate orientation changing transporter section are configured to define orientation changing passages having different sizes in cross-section.

BRIEF DESCRIPTION OF THE DRAWINGS

Further advantages, features and details of the present application will de elucidated on the basis of the following descriptions of serval embodiments thereof. Reference is made in the description to the figures.

FIG. 1A shows a side view.

FIG. 3A1, FIG. 3A2, FIG. 3B1, FIG. 3B2, FIG. 3C1, FIG. 3C2, FIG. 3D1, FIG. 3D2, FIG. 3E1, and FIG. 3E2 show perspective views of portions of an embodiment of a transporter system.

FIG. 6A shows, from point of view B as indicated in FIG. 1A, a front view of the orientation changing section, when the orientation changing section is operable in a first mode.

FIG. 6B shows, from point of view C as indicated in FIG. 1A, a rear view of the orientation changing section, when the orientation changing section is operable in a first mode.

DETAILED DESCRIPTION

Figure 1B:
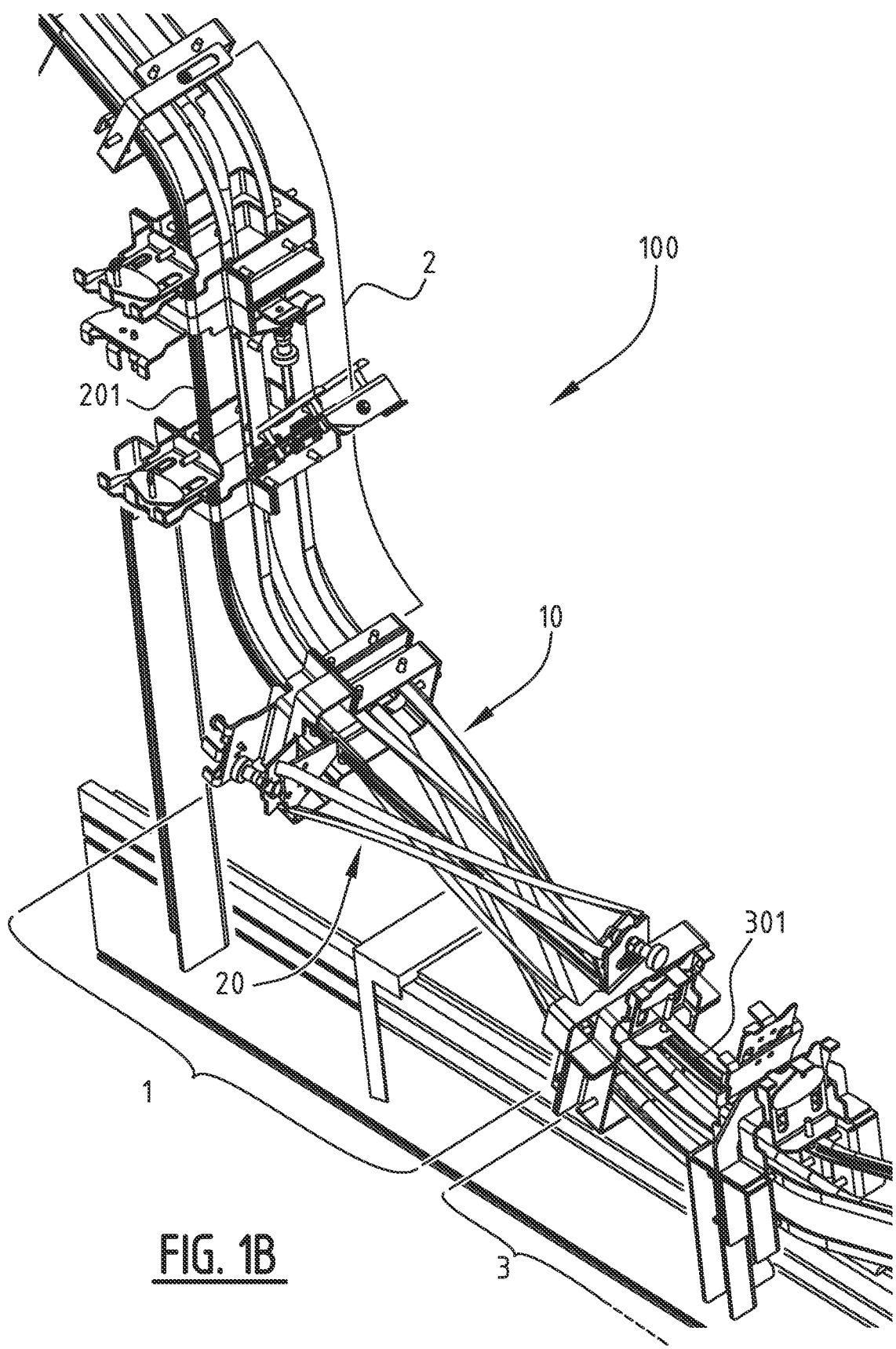
FIG. 1B shows a perspective view of a portion of an embodiment of a transporter system.

Before the present application is described in greater detail, it is to be understood that this application is not limited to particular embodiments described, as such may, of course, vary. It is also to be understood that the terminology used herein is for the purpose of describing particular embodiments only, and is not intended to be limiting, since the scope of the present application will be limited only by the appended claims.

Furthermore, unless defined otherwise, all technical and scientific terms used herein have the same meaning as commonly understood by one of ordinary skill in the art to which this application belongs. Still, certain elements are defined below for the sake of clarity and ease of reference.

Although any methods and materials similar or equivalent to those described herein can also be used in the practice or testing of the present application, representative illustrative methods and materials are now described.

Where a range of values is provided, it is understood that each intervening value, to the tenth of the unit of the lower limit unless the context clearly dictates otherwise, between the upper and lower limit of that range and any other stated or intervening value in that stated range, is encompassed within the application. The upper and lower limits of these smaller ranges may independently be included in the smaller ranges and are also encompassed within the application, subject to any specifically excluded limit in the stated range. Where the stated range includes one or both of the limits, ranges excluding either or both of those included limits are also included in the application.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete elements, components and features which may be readily separated from or combined with the features of any of the other several embodiments without departing from the scope of the present application. Any recited method can be carried out in the order of events recited or in any other order which is logically possible.

As mentioned above, the transporter system may comprise a plurality of sections, and each section may comprise a plurality of guide rails delimiting a passage through which the stream of substantially cylindrical objects may pass. For instance, the transporter system may comprise a plurality of wire-like guide rails, essentially arranged parallel to each other, positioned to surround an imaginary volume through which the cylindrical objects may be caused to move, for instance under the influence of gravity or by using an suitable drive unit such as an endless drive belt, in a controlled manner. The movement may involve rolling/rotation of the objects, sliding of the objects or a combination thereof. For instance, a passage having a rectangular cross-section may be formed by one or more upper guide rails, one or more lower guide rails, one or more guide rails at a right-hand side and one or more guide rails at left-hand side.

For a substantially cylindrical object to pass through such a passage, a cross-section of that passage should preferably be a narrow fit, but not too narrow. A balance is struck between allowing the cylindrical object to pass through the passage—i.e., between the guide rails—while avoiding a situation in which the substantially cylindrical object changes orientation unintentionally. If there is too little tolerance, any variation in the size of the substantially cylindrical object or change in the arrangement of the guide rails may impede proper transporting of the substantially cylindrical object in the passage, which might even lead to a blockage in the passage. Would there be too much tolerance, the substantially cylindrical object may fall over, tumble, or otherwise unintentionally change orientation and consequently risking getting stuck. To be able to fulfill such stringent tolerance requirements, transporter systems may be configured to transport a single type of substantially cylindrical object.

However, transporter systems are quite expensive to purchase and install, take up a lot of space and require continuous maintenance. Therefore, it is considered very advantageous for one transporter system to be able to operate in various modes, wherein in each mode the system is configured to transport a different type of substantially cylindrical objects.

Therefore, each section may comprise stationary guide rails arranged to delimit at least part of a passage through which the stream may pass, and at least one movable guide rail arranged to delimit a remaining part of the passage and configured to be moved from a first position to a second position, thereby changing at least one dimension of a cross-section of the passage. For straight and/or generally linear sections, this may be achieved by providing a single adjustable guide rail and moving this one adjustable guide rail from the first position to the second position. In both positions it is this one adjustable guide rail that delimits part of the passage.

Meanwhile, transporter systems may receive the stream of substantially cylindrical objects when each of the substantially cylindrical objects is in a lying orientation, for instance a horizontal orientation, while it is either necessary or advantageous to eject the stream of substantially cylindrical objects from the transporter system when each of the substantially cylindrical objects is standing up—i.e. vertically oriented. Therefore, a section may be provided configured to change the orientation of each of the substantially cylindrical objects in the stream of substantially cylindrical objects from the horizontal orientation to the vertical orientation.

This orientation changing transporter section then also needs to be able to handle the substantially cylindrical objects of varying types (sizes) discussed earlier. However, the earlier discussed solution of using a single adjustable guide rail is not suitable for use in such an orientation changing section. The curved nature of the passage delimited by orientation changing section 1 results in that, if a different size of passage is desired (i.e., a passage having a cross-section with dimensions different from that of an initial passage) at least one side of the different passage will have a length and/or curvature different from the length and/or curvature of the corresponding side in the initial passage.

Therefore, to be able to adequately delimit multiple passages in an orientation changing transporter section, multiple adjustable guide rails will have to be provided for one orientation changing section. Changing from passage from a first size to a passage to a second, larger or smaller size, requires the manual removal of one or more guide rails and replacing them with differently shaped guide rails. During the removal and replacement the transporter system cannot be used (which means a considerable down time) and the replacement requires an quite exact positioning of the newly installed guide rails in order to avoid blockage of the passage when in use.

Removing and installing adjustable guide rails is a time-consuming process and requires skilled personnel. Repeatedly removing and installing adjustable guide rails risks these adjustable guide rails being deformed or damaged. Also, when one of the adjustable guide rail is installed, the remaining adjustable guide rail(s) has (have) to be stored. When not stored in an appropriate position, an adjustable guide rail's own weight may deform the adjustable guide rail over time, rendering it useless.

Referring to FIGS. 1A and 1B, an embodiment of a transporter system 100 and part of a cylindrical object manufacturing unit 4 are shown. The shown embodiment of the transporter system 100 a first transporter section 2, in this specific embodiment a chute section, an orientation changing section 1, and a second transporter section 3, in this specific embodiment a conveyor section. Further sections of transporter system may precede chute section 2 and/or succeed conveyor section 3. The transporter system 100 preferably is a high-speed transporter system, i.e. a transporter system that is able to transport at least 350 cylindrical objects per minute and/or move the cylindrical objects with a speed of at least 50 meter (m) per minute. Such transporter sections may also be referred to as track-work sections.

Chute section 2 and conveyor section 3 comprise adjustable guide rails 201 and 301, respectively. Orientation changing section 1 is shown to comprise a stationary frame 10 and a rotatable frame 20.

Transporter system 100 is configured to transport a stream of substantially cylindrical objects or objects such as tin cans for food or beverages, glass pots, (parts of) pressured canisters, or battery housing.

For instance, the transporter system may be configured to allow handling of relatively large or small cylindrical cans. These relatively larger cans may have a content of 50 centiliters (cl), may be 166 millimeters (mm) high and may have a 60 mm diameter. The relatively smaller cans may have a content of 33 cl, may be 117 mm high and may have a 66 mm diameter. The cans may be designed to contain carbonated or non-carbonated liquids. The can may be a semi-finished product such as an object comprised of a cylindrical wall and one transverse end wall leaving one of the ends of the object open, or a finished product having two end walls.

The transporter system may be configured to allow handling of battery housing of around 80 mm high, and having a diameter of about 46 mm. The transporter system may be configured to allow handling of pressurized canisters such as aerosol cans (deodorant, etc.) or whipped cream. Such pressurized canisters may also be up to 400 mm high.

The transporter system is typically configured for, but not limited to, transporting cylindrical objects having a height of less than 100 cm and a diameter of less than 50 cm.

These substantially cylindrical objects are hereafter referred to as just the cylinders and the stream of substantially cylindrical objects is hereafter referred to as just the stream of cylinders. Cylindrical object manufacturing unit 4 may configured to eject one cylinder at a time.

Alternatively, transporter system 100 may be preceded by a buffer unit configured to receive a batch of cylinders, for example from storage, and provide these to the rest of system 100 in the form of the aforementioned stream of cylinders.

In the embodiment shown, the stream of cylinders originating from cylindrical object manufacturing unit 4 passes through chute section 2, orientation changing section 1, and transporter section 2 in that order.

When passing through each of the sections 1, 2, and 3 of system 100 a cylinder has a particular orientation. Cylinders have a longitudinal axis and in the context of this application, the orientation of a cylinder may be further defined based on the orientation of this longitudinal axis. When a cylinder passes through system 100 and sections 1, 2, and 3 thereof, the cylinder may travel along a certain trajectory. While passing through system 100 and section 1, 2, and 3, cylinders may be oriented such that their longitudinal axis is perpendicular to this trajectory. Therefore, the skilled person will appreciate that the orientation of a cylinder may be further defined based on the orientation of its longitudinal axis in a plane perpendicular to this trajectory.

The skilled person will appreciate that in the context of the application, when it is mentioned that a cylinder has a particular orientation in a particular section, it may mean that the corresponding section is configured to receive, eject, and/or have a cylinder pass through when the cylinder has that particular orientation. It may also mean that cylinders will have, or at least should have, approximately this orientation when system 100 and section 1, 2, and 3 operates and/or are operated correctly. It should not be understood as that system 100 or section 1, 2, or 3 are defined as not allowing for the cylinder to have a different orientation in system 100 or section 1, 2, or 3 thereof at all.

When the cylinders are ejected from cylindrical object manufacturing unit 4 and received by chute section 2, the cylinders have a substantially horizontal orientation (see FIGS. 3A1 and 3A2). In the field of reference of system 100, the cylinder may be said to be laying down.

While passing through chute section 2, the cylinders maintain this horizontal orientation (see FIGS. 3B1 and 3B2). In this orientation, cylinders may roll and/or fall through chute section 2, gaining momentum. When the cylinders are ejected from chute section 2 and received by orientation changing section 1, the cylinders have the substantially horizontal orientation (see FIGS. 3C1 and 3C2).

While passing through orientation changing section 1, the orientation of the cylinders is changed from the horizontal orientation to a substantially vertical orientation (see FIGS. 3C1, 3C2, 3D1 and 3D2). Depending on the degree by which the orientation of a cylinder has changed, cylinders may start out rolling, and may end up sliding through orientation changing section 1. In the substantially vertical position, cylinders may slide through orientation changing section 1. Such a sliding motion may be maintaining for some distance due to momentum previously obtained in chute section 2 and/or force of gravity depending on the positioning of orientation changing section 1 with respect to the direction of gravity. When the cylinders are ejected from orientation changing section 1 and received by conveyor section 3, the cylinders have the substantially vertical orientation (see FIGS. 3D1 and 3D2).

While passing through conveyor section 3, the cylinders maintain the substantially vertical orientation (see FIGS. 3E1 and 3E2). In the field of reference of system 100, the cylinder may then be said to be standing upright, or, depending on whether the cylinder has a naturally identifiable top and/or bottom, may be said to be standing upside down.

The orientation of a cylinder, when passing through system 100 and sections 1, 2, and 3, may be relevant for being able to successfully transport this cylinder through system 100 and sections 1, 2, and 3. For example, in chute section 2 a cylinder is oriented substantially horizontally and therefore may roll through parts of chute section 2, thereby gaining momentum. Said momentum may then be employed for moving the cylinder through orientation changing member 1 and through a first part of conveyor section 3, before the cylinder arrives at a conveyor 302. Conveyor 302, being an active element for transporting, may convey a cylinder without the cylinder having prior momentum. In another example, it may be preferred that the orientation of cylinders in a stream of cylinders is the same for each cylinder, making the way that each cylinder moves through system 100 and sections 1, 2, and 3 more predictable.

Figure 2A:
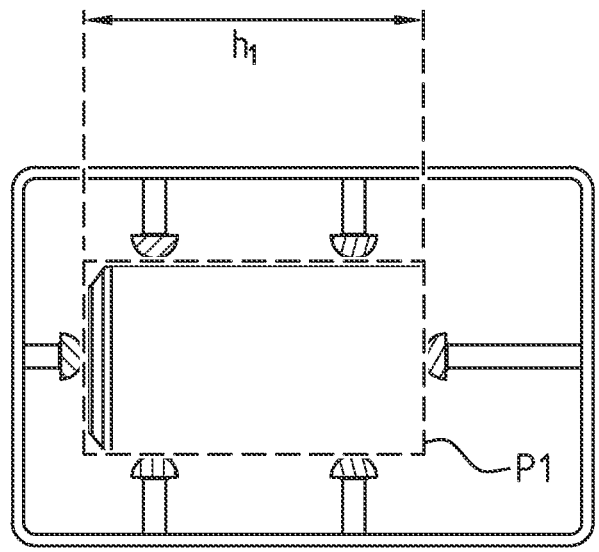
FIG. 2A and FIG. 2B show, from point of view A as indicated in FIG. 1A, cross-sections of a chute section of the transporter system as shown in FIGS. 1A and 1B when the cute section is operable in a first mode and a second mode, respectively.
Figure 2B:
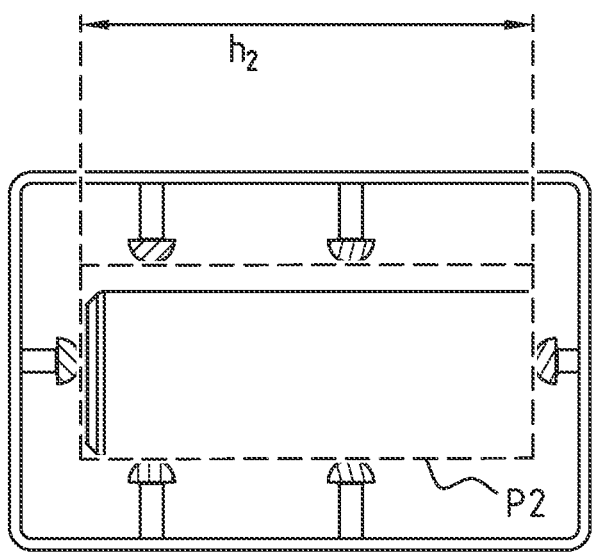

As shown in FIGS. 2A and 2B, chute section 2 may comprise a plurality of guide rails that delimit a passage having a substantially cylindrical cross-section P1 or P2. The cross-section of a passage should be a bit larger than the cylinder to ensure it may pass through the passage. The cross-section of a passage should not be a lot larger than the cylinder to ensure that the cylinder does not fall over, tumble, or change its orientation unintentionally in any other way.

To facilitate cylinders of varying heights, system 100 may be operated in a first mode, in which it is configured to transport a stream of a first type of cylinder, and system 100 may be operated in a second mode, in which it is configured to transport a stream of a second, taller type of cylinder. A cylinder of the second type may have a height larger than a height of a cylinder of the first type.

As mentioned in relation to FIG. 1A, chute section 2 is provided with adjustable guide rail 201 and conveyor section 3 is provided with adjustable guide rail 301. These adjustable guide rails 201, 301 may be moved with respect to the further guide rails delimiting the passage of this section, thereby changing the passage. Specifically, as shown in FIG. 2A, in the first mode adjustable guide rail 201 of chute section 2 may be in a first position, thereby delimiting a passage having a substantially rectangular cross-section P1, P1 having a height h1. Alternatively said, in the first mode adjustable guide rail 201 may be arranged at a distance h1 from a guide rail arranged opposite thereof. As shown in FIG. 2B, in the second mode adjustable guide rail 201 may be in a second position thereby delimiting a passage having a substantially rectangular cross-section P2, this cross-section having a height h2. Alternatively said, in the second mode adjustable guide rail 201 may be arranged at a distance h2 from a guide rail arranged opposite thereof.

The skilled person will appreciate that the cross-section of chute section 2 and/or conveyor section 3 may also have other shapes than rectangular. The cross-section may be square, or otherwise polygonal, or further shapes.

Positioning of adjustable guide rail 201 in the first mode is further elucidated in FIGS. 3A1, 3B1, and 3C1. Positioning of adjustable guide rail 201 in the second mode is further elucidated in FIGS. 3A2, 3B2, and 3C1.

A cross-section of conveyor section 3 may be similar to the shown cross-sections of chute section 2. Positioning of adjustable guide rail 301 in the first mode is further elucidated in FIGS. 3D1, and 3E1. Positioning of adjustable guide rail 301 in the second mode is further elucidated in FIGS. 3D2, and 3E1.

From the abovementioned positions that adjustable guide rail 201 has in the first and second mode, the skilled person may derive that to change chute section 2 from operating in the first mode to operating in the second mode may achieved by moving adjustable guide rail 201 from the first position to the second position. The flat and/or linear nature of the side of the passage delimited by adjustable guide rail 201 results in said side of the passage being of substantially the same shape and/or size in the first mode and the second mode. That is, the same adjustable guide rail 201 or at least an adjustable guide rail having the same shape and/or size may be used to delimit part of the passage through chute section 2 when chute section 2 is configured to operate in the first mode, as well as when chute section 2 is configured to operate in the second mode. The same solution is not available when wanting to provide an orientation changing section 1 configurable to be operated it both a first and a second mode. The curved nature of a passage delimited by orientation changing section 1 results in that, of a different passage is desired (i.e., a passage having a cross-section with dimensions different from that of the initial passage) at least one side of the different passage will have a length and/or curvature different from the length and/or curvature of the corresponding side in the first passage. Therefore, to adequately be able to delimit multiple passages, multiple adjustable guide rails will have to be provided for one orientation changing section.

Figure 4A:
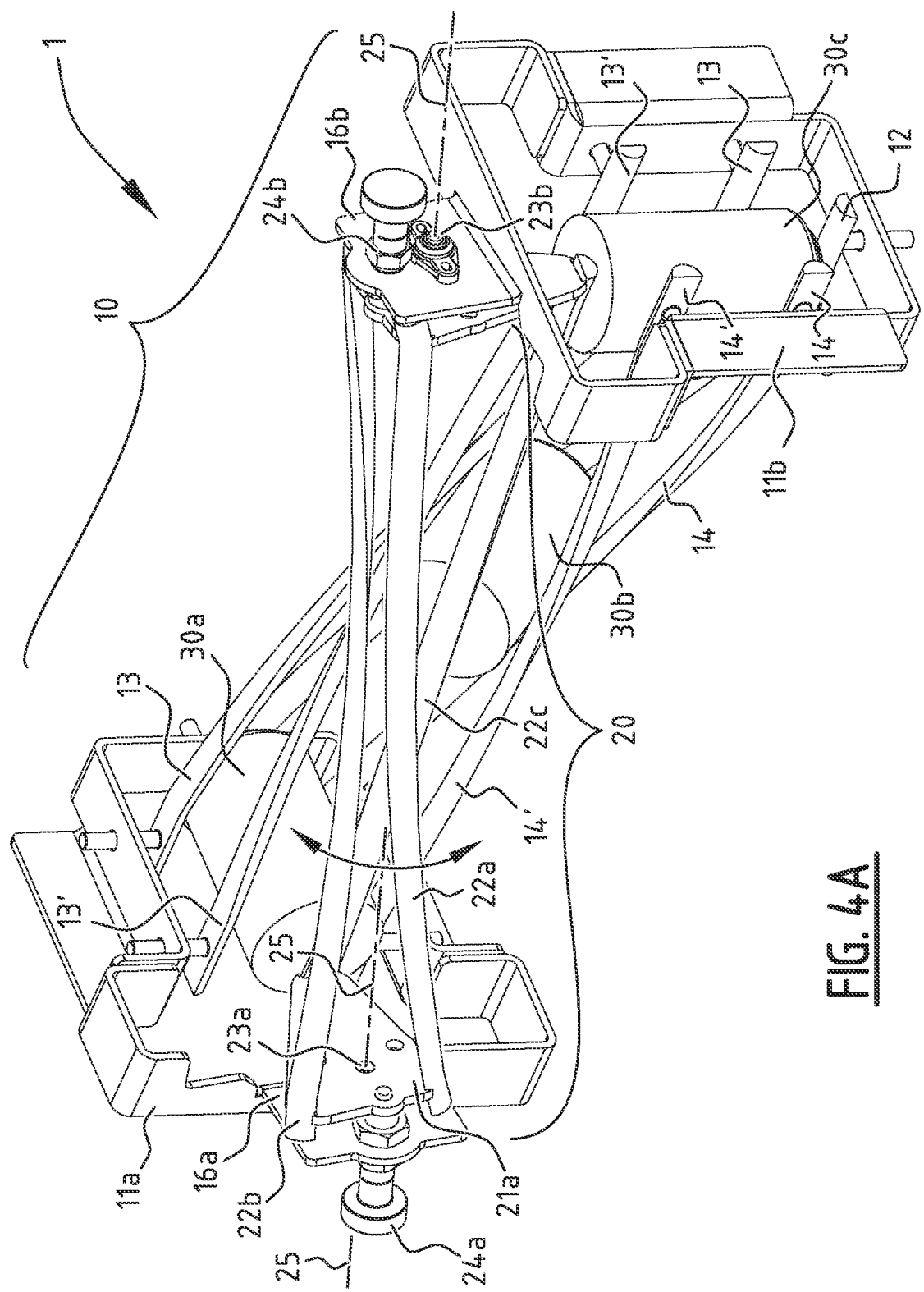
FIG. 4A and FIG. 4B show a perspective view of an embodiment of an orientation changing section.

Referring to FIG. 4A, orientation changing section 1 is shown to comprise a stationary frame 10 and a rotatable frame 20. Stationary frame 10 is shown to comprise input 11a and output 11b. Stationary frame 10 is further shown to comprise stationary guide rails 12, 13, 13', 14, 14' arranged to delimit part of a passage extending from input 11a to output 11b. The stationary guide rails of section 1 may each be fixedly attached to input 11a and output 11b. Stationary frame 10 is further shown to comprise an input-side flange 16a and an output-side flange 16b. Input-side flange 16a may be fixedly attached to input 11a and output-side flange 16b may be fixedly attached to output 11b.

Figure 4B:
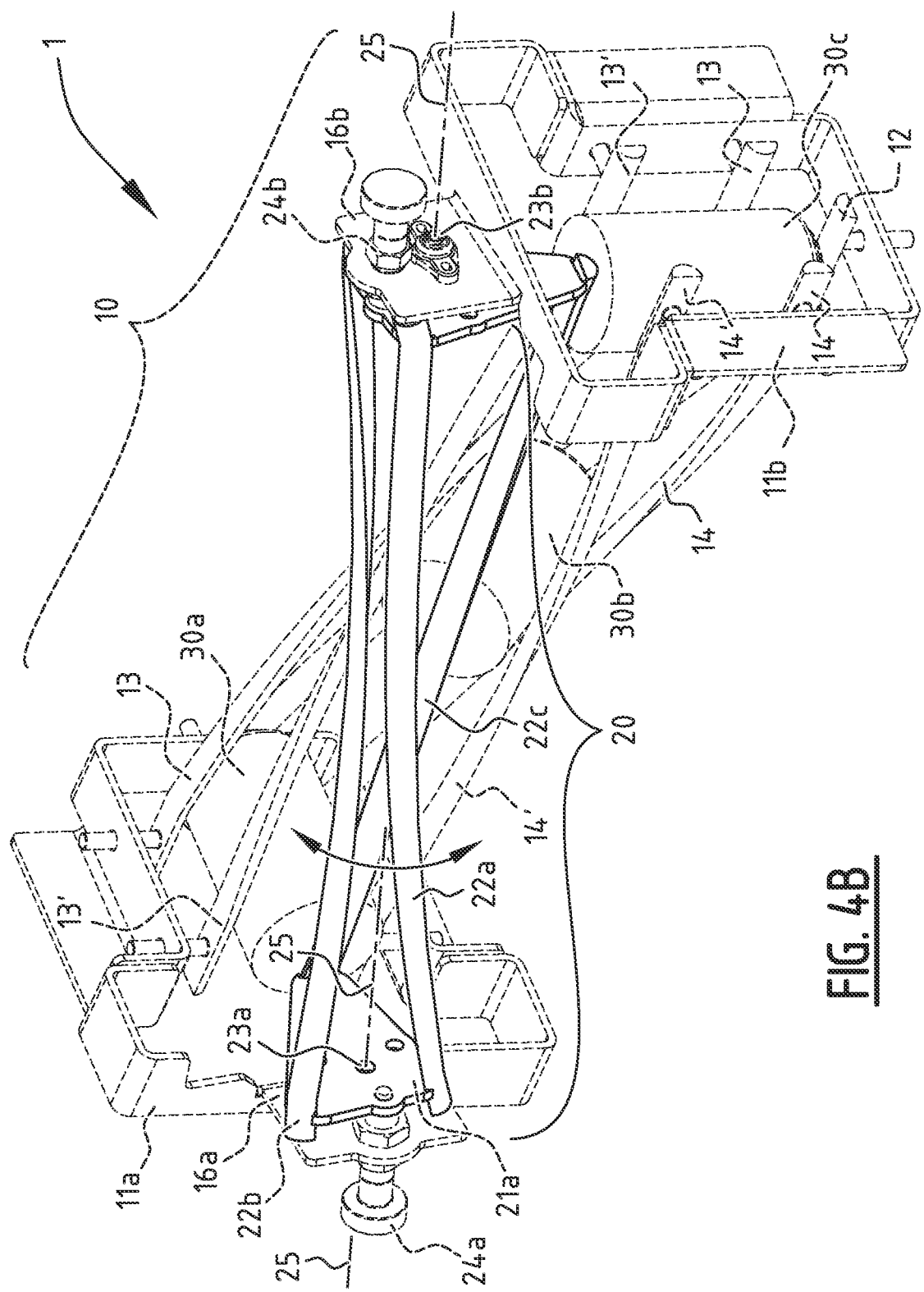

Rotatable frame 20, specifically outlined in FIG. 4B, is shown to comprise an input side plate 21a and an output side 21b. Rotatable frame 20 is further shown to comprise a first adjustable guide rail 22a, a second adjustable guide rail 22b, and a third adjustable guide rail 22c. Adjustable guide rails 22a, 22b, and 22c of rotatable frame 20 may be fixedly attached to input-side plate 21a and output-side plate 21b. Embodiments of orientation changing section 1 are conceivable of which the rotatable frame comprises two adjustable guide rails, or of which the rotatable frame comprises four or more adjustable guide rails.

Stationary frame 10 and rotatable frame 20 are shown to be connected to one another via input-side rotation connection 23a and output-side rotation connection 23b. Said rotation connection allow for frames 10, 20 to rotate with respect to one another, around rotational axis 25. However, the skilled person will appreciate that, when included in transporter system 100, stationary frame 10 may be fixedly attached to directly adjacent sections whereas rotatable frame 20 is generally not. Therefore, it may be said that rotatable frame 20 may be rotated to a rotational position with respect to stationary frame 10.

The relative position between stationary frame 10 and rotatable frame 20 may be fixed using one or both of input-side locking pin 24a and/or output-side locking pin 24b. Locking rotatable frame 20 in a specifically preferred rotational position may be simplified by providing a hole in input-side plate 21a or output-side 21b such that locking pin 24a or locking pin 24b, when engaging said hole, fixedly locks rotatable frame 20 in this preferred rotational position.

Positioning rotatable frame in any one of a number of preferred rotational positions may thus be relatively simple and achieved with sufficient accuracy without requiring extensive tuning of the mutual position between the various guiding rails. Since adjustable guide rails 22a, 22b, and 22c may each be installed in orientation changing section 1, and specifically may be installed on rotatable frame 20 at the same time, changing from the first mode to second mode, does not require newly installing one or more of these guide rails. Tuning and installment are processes generally prone to errors and for which personnel has to be trained.

Also, because each of adjustable guide rails 22a, 22b, and 22c may remain part of orientation changing section 1 even when these are not used to delimit the passage through orientation changing section 1, there is no need for an additional storage where adjustable guide rails of further shapes and/or sizes are kept. Therefore, adjustable guide rails 22a, 22b, and 22c of orientation changing section 1 are less at risk of being damaged and/or deformed when not in use.

In the embodiments of orientation changing section 1 shown, stationary guide rails 12, 13, 13', 14, 14' are arranged to delimit most of a passage of which the cross-section is substantially rectangular at any point along the passage. Specifically, a first side of the passage may be delimited by stationary first side guide rails 13, 13' and a second side of the passage opposite the first side may be delimited by stationary second side guide rails 14, 14'. A third side of the passage, adjacent to the first side and the second side, may be delimited by stationary third guide rail 12. The skilled person will appreciate that the cross-section of orientation changing section 1 may also have other shapes than rectangular. The cross-section may be square, otherwise polygonal, or have further shapes.

Figure 5A:
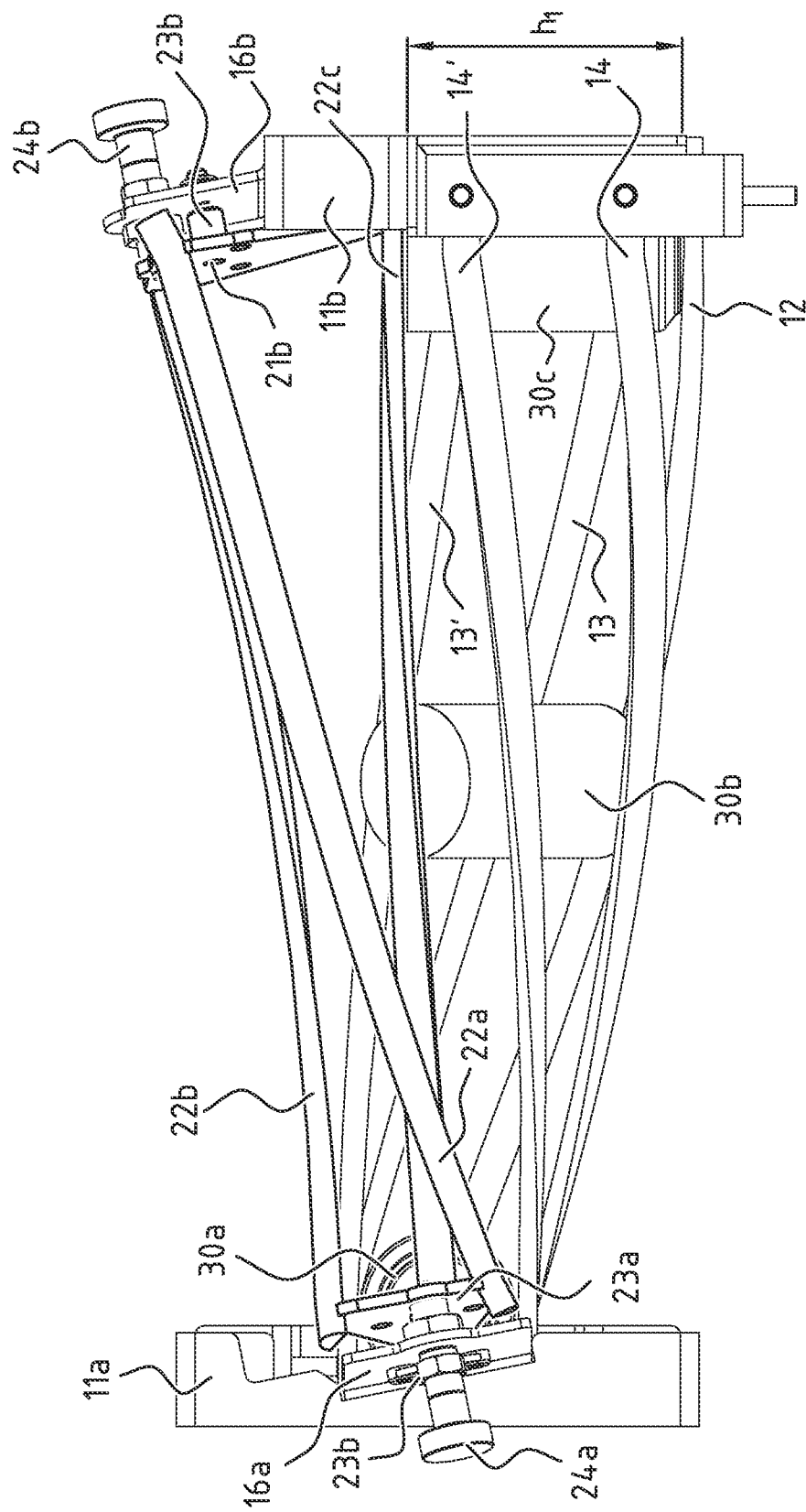
FIG. 5A and FIG. 5B show a side view of the orientation changing section shown in FIGS. 4A and 4B, when the orientation changing section is operable in a first mode and a second mode, respectively.

FIG. 5A shows that orientation changing section 1 may be configured to operate in the first mode by positioning rotatable frame 20 in the first rotational position, preferably locking rotatable frame 20 in place using locking pins 24a, 24b. In the first mode of operation, adjustable guide rail 22c delimit a fourth side of the passage, opposite the third side and adjacent to the first and second sides. Defined by the distance between stationary third side guide rail 12 and adjustable guide rail 22c, the rectangular cross-section of the passage may have height h1, all throughout the delimited passage.

FIGS. 6A and 6B show, in the same field of reference, a front view (from point of view B as indicated in FIG. 1A) and a rear view (from point of view C as indicated in FIG. 1A) of orientation changing section 1 configured to operate in the first mode. Specifically, FIG. 6A shows that, at input 11a, cross-section P1 of the delimited passage has height h1. FIG. 6A further shows that input 11a is configured to receive a horizontally oriented cylinder 30a. FIG. 6B shows that, at output 11b, cross-section P1 of the delimited passage also has height h1. FIG. 6B further shows that input 11a is configured to eject a vertically oriented cylinder 30c.

The skilled person will appreciate that input 11a and output 11b of the embodiment shown are rotated 90 degrees relative to each other. This corresponds to the change in orientation of the cylinder effected by passing through orientation changing section 1: The longitudinal axis of the cylinder 30a is rotated 90 degrees relative to the longitudinal axis of cylinder 3c. Embodiments are also conceivable of which the input and output are rotated relative to each other at other angles, such as 45 degrees or 135. Input 11a and output 11b may be configured to receive any combination of a first orientation and a second orientation, different from the first orientation, conceivable.

By rotating rotatable frame 20 from the first rotational position to the second rotational position, the positions of adjustable guide rails 22a, 22b, and 22c may be changed and instead of adjustable guide rails 22c, it may be adjustable guide rail 22a that delimits the fourth side of the passage through orientation changing section 1. Adjustable guide rails 22c may be mounted on rotatable frame 20 at a first distance from rotational axis 25. Adjustable guide rail 22a may be mounted on rotatable frame 20, at a second distance, smaller than the first distance, from rotational axis 25.

Figure 5B:
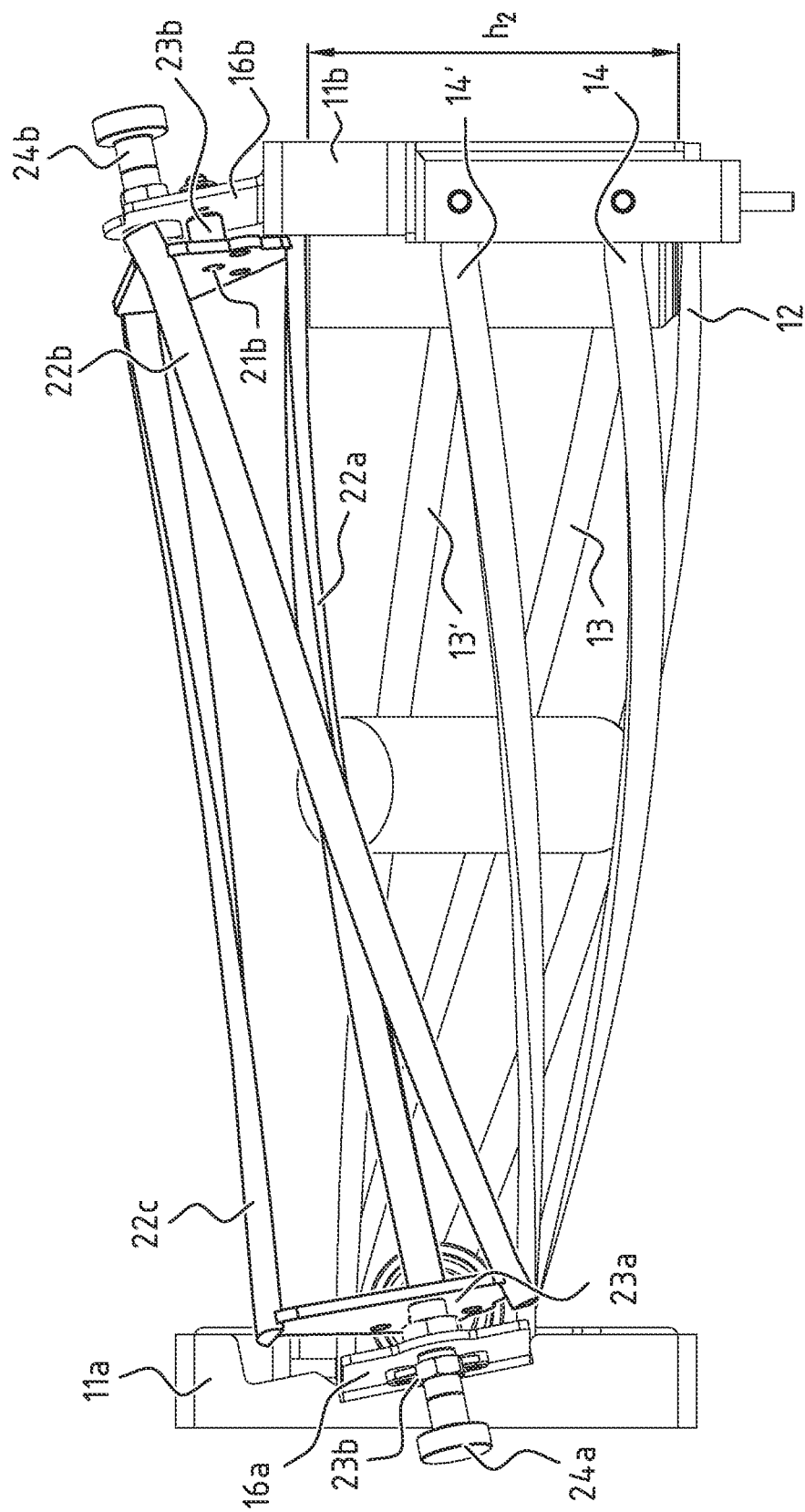

FIG. 5B shows that orientation changing section 1 may be configured to operate in the second mode by positioning rotatable frame 20 in the second rotational position, preferably locking rotatable frame 20 in place using locking pins 24a, 24b. Defined by the distance between stationary third side guide rail 12 and adjustable guide rail 22a, the rectangular cross-section of the passage may have height h1, all throughout the delimited passage.

Figure 7A:
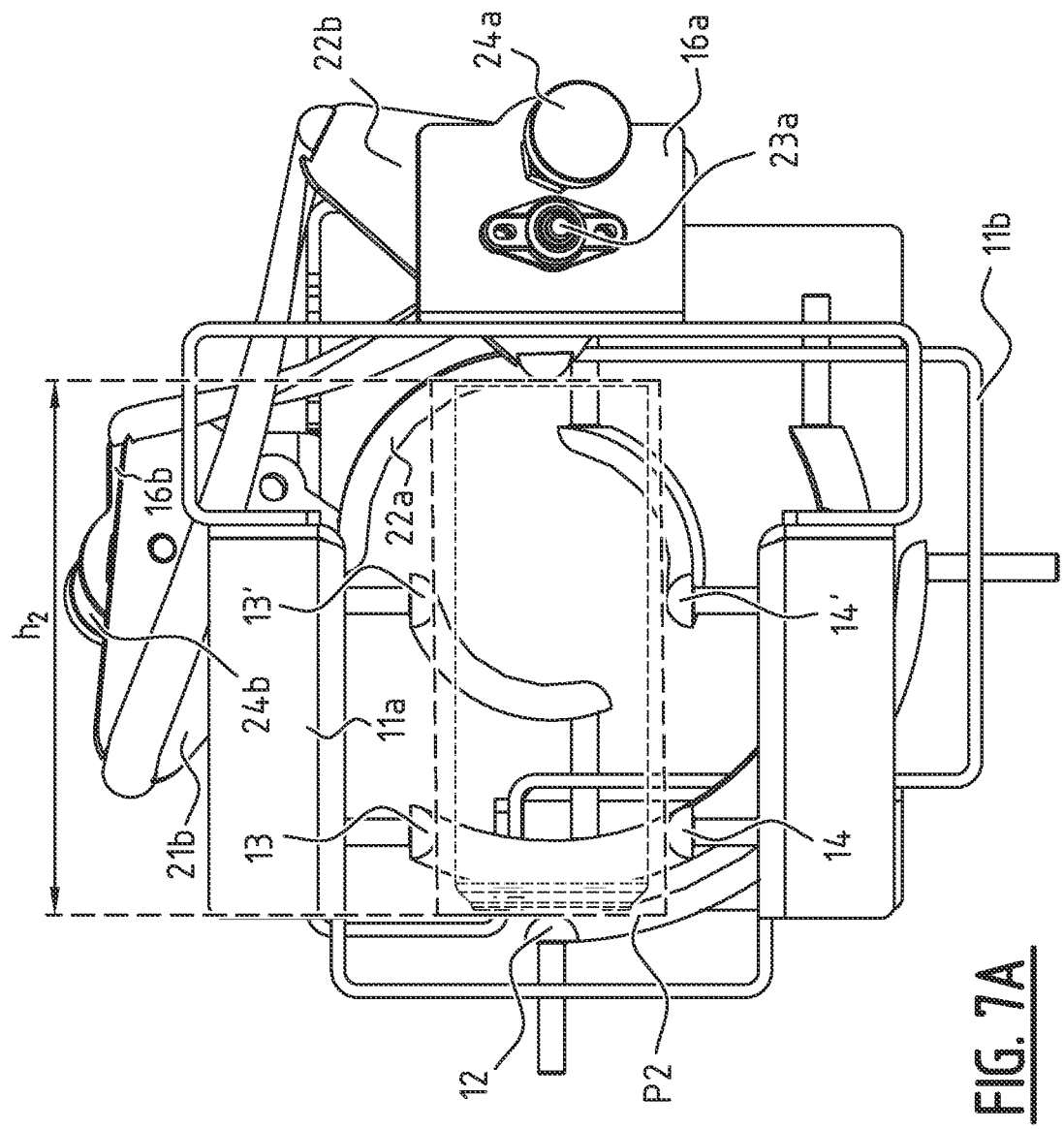
FIG. 7A shows, from point of view B as indicated in FIG. 1A, a front view of the orientation changing section, when the orientation changing section is operable in a second mode.
Figure 7B:
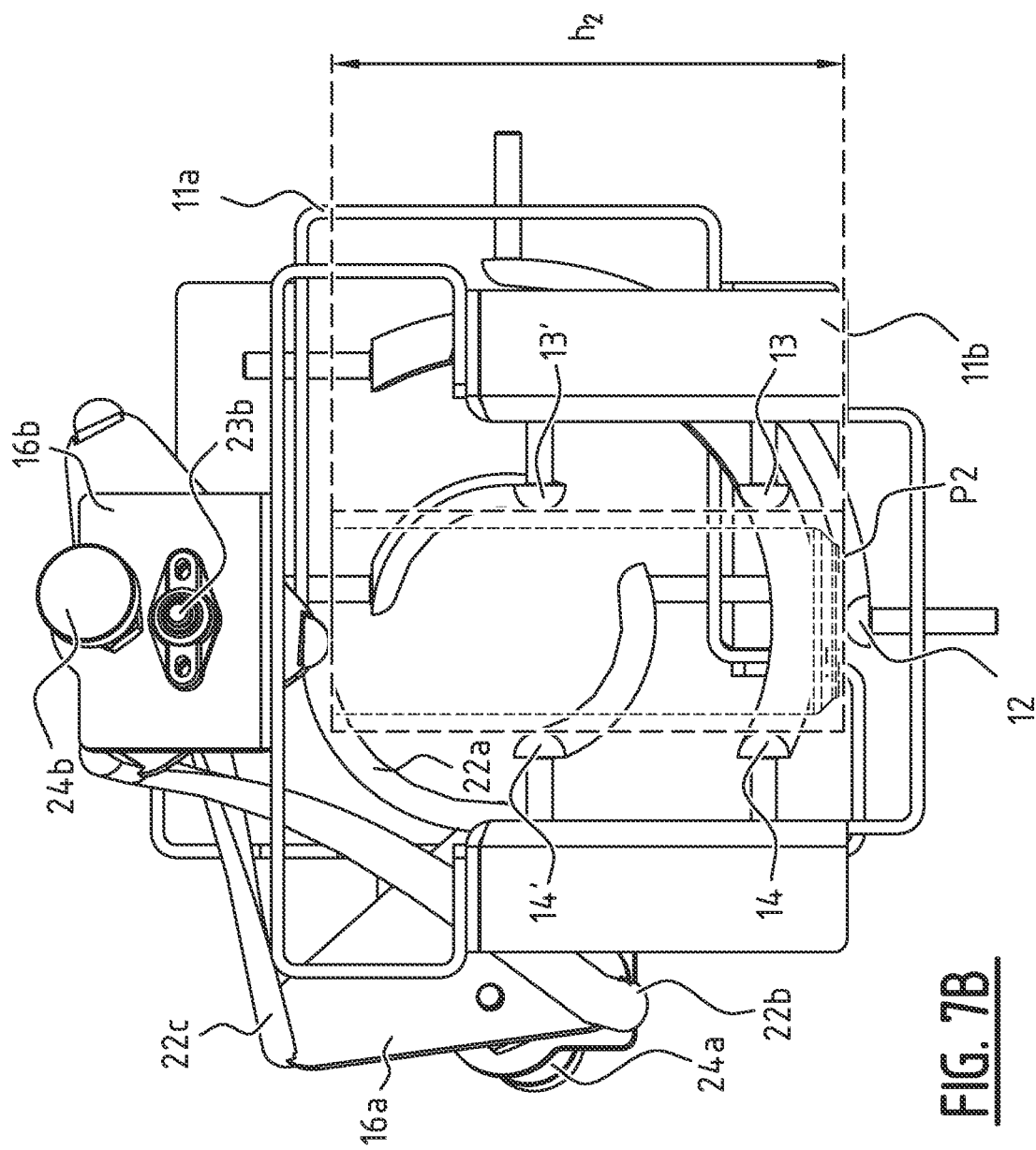
FIG. 7B shows, from point of view C as indicated in FIG. 1A, a rear view of the orientation changing section, when the orientation changing section is operable in a second mode.
Figure 8:
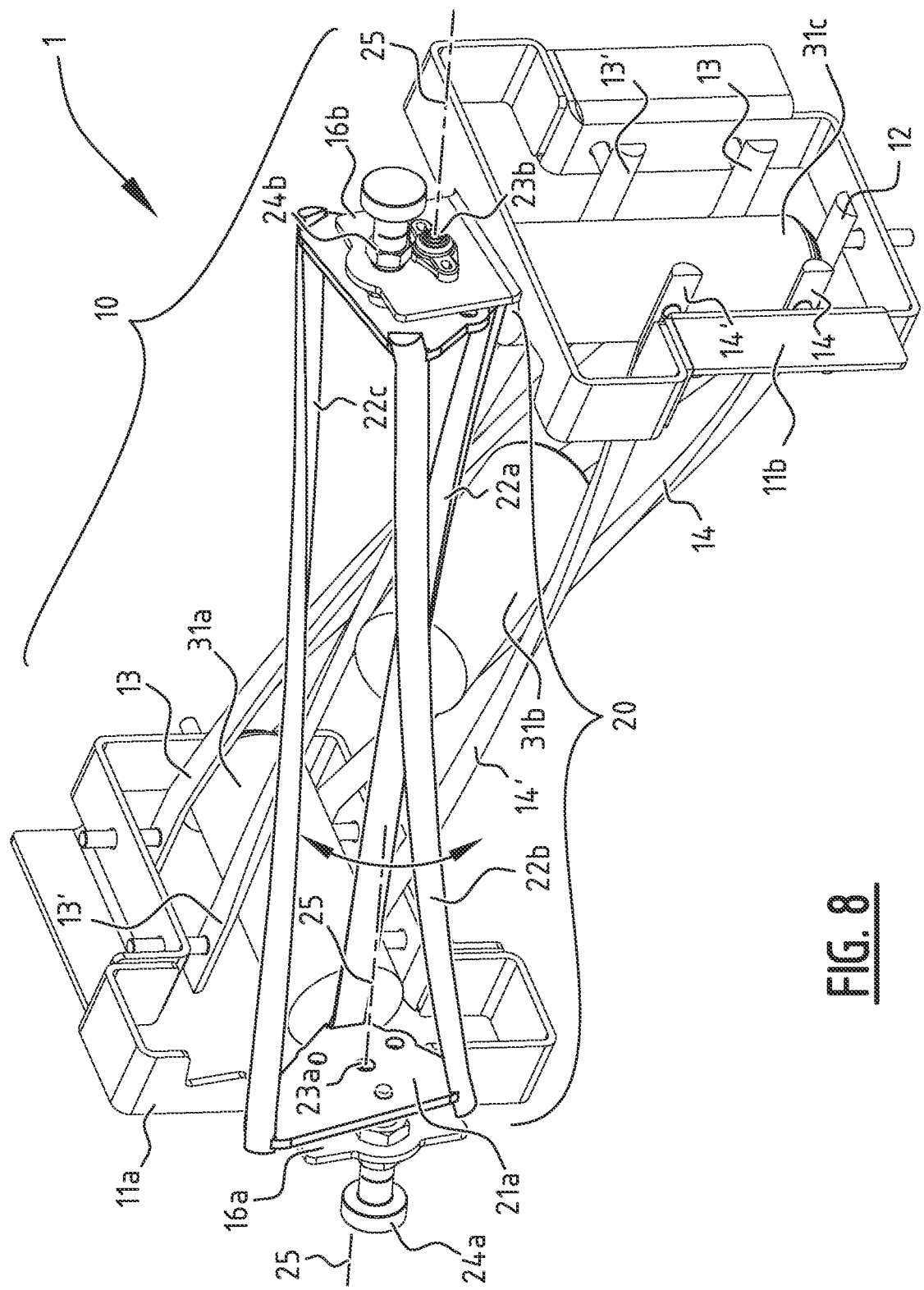
FIG. 8 shows show a perspective view of an embodiment of an orientation changing section when it is operable in a second mode.

FIGS. 7A and 7B show, in the same field of reference, a front view (from point of view B as indicated in FIG. 1A) and a rear view (from point of view C as indicated in FIG. 1A) of orientation changing section 1 configured to operate in the second mode. Specifically, FIG. 7A shows that, at input 11a, cross-section P2 of the delimited passage has height h2. FIG. 7A further shows that input 11a is configured to receive a horizontally oriented cylinder 30a. FIG. 7B shows that, at output 11b, cross-section P2 of the delimited passage also has height h2. FIG. 7B further shows that input 11a is configured to eject a vertically oriented cylinder 30c. FIG. 8 shows a perspective view of orientation changing section 1 similar to FIGS. 4A and 4B but in which orientation changing section 1 is configured to operate in the second mode.

Accordingly, the preceding merely illustrates the principles of the application. It will be appreciated that those skilled in the art will be able to devise various arrangements which, although not explicitly described or shown herein, embody the principles of the application and are included within its spirit and scope. Furthermore, all examples and conditional language recited herein are principally intended to aid the reader in understanding the principles of the application and the concepts contributed by the inventors to furthering the art and are to be construed as being without limitation to such specifically recited examples and conditions. Moreover, all statements herein reciting principles, aspects, and aspects of the application as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

The scope of the present disclosure, therefore, is not intended to be limited to the exemplary aspects shown and described herein. Rather, the scope of present disclosure is defined by the appended claims and their equivalents.

What is claimed is:

1. Transporter system for transporting a stream of substantially cylindrical objects, the transporter system comprising:
   a first and second transporter section, wherein each transporter section comprises:
      an inlet, configured to receive the stream of substantially cylindrical objects;
      an outlet, configured to discharge the stream of substantially cylindrical objects;
      a plurality of stationary guide rails arranged to delimit a part of a passage through which the stream of substantially cylindrical objects is guided, and wherein the passage extends from the inlet to the outlet; and
      at least one movable guide rail arranged to delimit a remaining part of the passage, and configured to be moved from a first position to at least a second position to change a size of a cross-section of the passage;
   wherein the first transporter section is configured to delimit a first passage wherein the substantially cylindrical objects extend in a first orientation and the second transporter section is configured to delimit a second passage wherein the substantially cylindrical objects extend in a second orientation different from the first orientation;
   an intermediate orientation changing transporter section arranged between the first and second transporter section, the intermediate orientation changing transporter section comprising:
      an inlet configured to receive the stream of substantially cylindrical objects from the first transporter section,
      an outlet configured to discharge the stream of substantially cylindrical objects to the second transporter section, and
      a further plurality of stationary guide rails arranged to delimit at least part of an orientation changing passage through which the stream of substantially cylindrical objects is guided;
   wherein the intermediate orientation changing transporter section further comprises a rotatable frame configured to be rotated with respect to the further plurality of stationary guide rails to a plurality of rotational positions,
   wherein the rotatable frame comprises a first movable guide rail configured to delimit a remaining part of the orientation changing passage when the rotatable frame is in a first rotational position and a second movable guide rail configured to delimit the remaining part of the orientation changing passage when the rotatable frame is in a second rotational position;
   wherein the further plurality of stationary guide rails and the rotatable frame with the first and second movable guide rails are configured to, when the stream of substantially cylindrical objects is guided through the orientation changing passage, change the orientation of each of the substantially cylindrical objects in the stream of substantially cylindrical objects from the first orientation to the second orientation; and
   wherein the first and second movable guide rails of the intermediate orientation changing transporter section are configured to define orientation changing passages having different sizes in cross-section.

2. The transporter system according to claim 1, wherein the rotatable frame is further configured to be rotated around a rotational axis, and wherein the first and the second movable guide rails of the intermediate orientation changing transporter section are mounted on the rotatable frame at a first distance from the rotational axis and a second distance from the rotational axis, different from the first distance, respectively.

3. The transporter system according to claim 1, wherein the intermediate orientation changing transporter section is further configured to, when the stream of substantially cylindrical objects passes through the orientation changing passage of the intermediate orientation changing transporter section, change the orientation of each of the substantially cylindrical objects in the stream of substantially cylindrical objects by between 45 and 135 degrees.

4. The transporter system according to claim 3, wherein the orientation of each of the substantially cylindrical objects in the stream of substantially cylindrical objects is changed by approximately 90 degrees.

5. The transporter system according to claim 1, wherein each substantially cylindrical object from the stream of substantially cylindrical objects defines a longitudinal axis and wherein the intermediate orientation changing transporter section is configured to, when the substantially cylindrical object passes through the orientation changing passage of the intermediate orientation changing transporter section, change the orientation of the longitudinal axis of the substantially cylindrical objects.

6. The transporter system according to claim 1, wherein the first and second moveable guide rails are comprised in a plurality of movable guide rails, and wherein each movable guide rail from the plurality of movable guide rails corresponds to a rotational position.

7. The transporter system of claim 6, wherein there is a one-to-one relationship between movable guide rails from the plurality of movable guide rails and rotational positions from the plurality of rotational positions.

8. The transporter system according to claim 1,
wherein the rotatable frame further comprises one or more further movable guide rails,
wherein the plurality of rotational positions comprises one or more further rotational positions corresponding to the one or more further movable guide rails; and
wherein, when the rotatable frame is positioned in one of the one or more further rotational positions, the associated movable guide rail delimits the remaining part of the passage of the intermediate orientation changing transporter section.

9. The transporter system according to claim 1 wherein, in the first and second transporter section, the plurality of stationary guide rails and at least one movable guide rail are arranged to delimit a passage having a substantially rectangular cross-section, the rectangular cross-section being described by a height and a width.

10. The transporter system according to claim 9, wherein, in the first and second transporter sections, the at least one movable guide rail is further configured to be moved from the first position to the second position, thereby changing either the height, or the width of the cross-section of the passage.

11. The transporter system according to claim 1, wherein, in the intermediate orientation changing transporter section, the plurality of stationary guide rails and least one movable guide rail are arranged to delimit a passage having a substantially rectangular cross-section, the rectangular cross-section being described by a height and a width.

12. The transporter system according to claim 1, wherein the outlet of the first transporter section is connected to the inlet of the intermediate orientation changing transporter section and/or wherein the outlet of the intermediate orientation changing transporter section is connected to the inlet of the second transporter section.

13. The transporter system according to claim 1, wherein the outlet of the first transporter section is configured to discharge the stream of substantially cylindrical objects to the inlet of the intermediate orientation changing transporter section; and/or wherein the outlet of the intermediate orientation changing transporter section is configured to discharge the stream of substantially cylindrical objects to the inlet of the second transporter section.

14. The transporter system according to claim 1, wherein the inlet of the intermediate orientation changing transporter section is configured to receive the stream of substantially cylindrical objects in the first orientation and/or wherein the outlet of the intermediate orientation changing transporter section is configured to discharge the stream of substantially cylindrical objects in the second orientation, different from the first orientation.

15. The transporter system according to claim 1, wherein the first orientation is substantially horizontal and/or wherein the second orientation is substantially vertical.

16. The transporter system according to claim 1, wherein the first transporter section is configured for each of the substantially cylindrical objects from the stream in the first orientation to roll and/or fall through the passage.

17. The transporter system according to claim 1, wherein the second transporter section is configured for each of the substantially cylindrical objects from the stream in the second orientation to slide through the passage.

18. Orientation changing transporter section of a transporter system according to claim 1.

19. Orientation changing transporter section as claimed in claim 18 and further configured to be included in a transporter system for transporting a stream of substantially cylindrical objects, wherein the orientation changing transporter section comprises an inlet configured to receive the stream of substantially cylindrical objects, an outlet configured to discharge the stream of substantially cylindrical objects, a plurality of stationary guide rails arranged to delimit at least part of a passage through which the stream of substantially cylindrical objects is guided, wherein the intermediate orientation changing transporter section further comprises a rotatable frame configured to be rotated with respect to the plurality of stationary guide rails to a plurality of rotational positions, wherein the rotatable frame comprises a first movable guide rail configured to delimit the remaining part of the orientation changing passage when the rotatable frame is in first rotational position and a second movable guide rail configured to delimit the remaining part of the orientation changing passage when the rotatable frame is the second rotational position, wherein the plurality of stationary guide rails and the rotatable frame with the first and second movable guide rails are configured to, when the stream of substantially cylindrical objects is guided through the orientation changing passage, change the orientation of each of the substantially cylindrical objects in the stream of substantially cylindrical objects from the first orientation to the second orientation, and wherein the first and second movable guide rails of the intermediate orientation changing transporter section are configured to define orientation changing passages having different sizes in cross-section.

* * * * *